United States Patent [19]

Kalogerson et al.

[11] 3,939,948
[45] Feb. 24, 1976

[54] BRAKE CONTROLLED IGNITION RETARDER

[75] Inventors: Thomas A. Kalogerson, Bloomington, Minn.; Joseph E. Dandois, Montoursville, Pa.

[73] Assignee: Optimizer Control Corporation, Minneapolis, Minn.

[22] Filed: Jan. 16, 1975

[21] Appl. No.: 541,592

Related U.S. Application Data

[60] Division of Ser. No. 231,766, March 3, 1972, Pat. No. 3,871,341, which is a continuation of Ser. No. 100,081, Dec. 21, 1970.

[52] U.S. Cl............................................. 192/3 R
[51] Int. Cl.² ...................................... B60K 29/02
[58] Field of Search ................................ 192/3 R

[56] References Cited
UNITED STATES PATENTS

| | | | |
|---|---|---|---|
| 2,793,706 | 5/1957 | Moreland | 192/3 R |
| 3,023,870 | 3/1962 | Udelman | 192/3 R |
| 3,581,852 | 6/1971 | Griffen | 192/3 R |

Primary Examiner—Benjamin W. Wyche
Attorney, Agent, or Firm—Frederick E. Lange

[57] ABSTRACT

An ignition retarding device which cuts off the usual vacuum ignition advance to retard the ignition when the brakes are actuated or when the engine speed drops below a predetermined value, there being a further device responsive to engine temperature to restore the vacuum ignition advance whenever the temperature of the engine rises above a predetermined value. The speed is measured by an electronic tachometer whose input is connected across the distributor points and whose output is fed through a voltage comparator and an amplifier to control the energization of an electrically operated valve. The override brake and temperature signals are obtained by connections to the usual brake switch and temperature switch. Provision is made for use of the equipment with automotive vehicles either in which the brake switch is between the brake light and ground or between the battery and the brake light.

10 Claims, 4 Drawing Figures

BRAKE CONTROLLED IGNITION RETARDER

This application is a division of application Serial No. 231,766, filed Mar. 3, 1972, now U.S. Pat. No. 3,871,341, which application is in turn a continuation of application Ser. No. 100,081, filed Dec. 21, 1970.

BACKGROUND OF THE INVENTION

It is customary in connection with automotive vehicles using internal combustion engines to employ a so-called vacuum advance in which the ignition is advanced through a vacuum motor operatively connected to the distributor and to the intake manifold. Thus, as the intake manifold suction increases, the timing is advanced. When the engine is operating at normal driving speeds, the arrangement just described results in relatively efficient combustion with acceptable emission standards as far as pollution is concerned. When, however, the engine is idling or decelerating to a stop, the hydrocarbon output becomes relatively high percentagewise. Thus, when the automobiles are coming to a halt after being braked or when they are being driven at very low speeds in heavy traffic or are idling while waiting for a stop light to change, the hydrocarbon output is relatively high where the spark is advanced in the usual manner. It has been known for some time that retarding the spark under these conditions increases the extent to which the hydrocarbons are burned. This is partly due to the fact that the engine tends to operate at a higher temperature with a less advanced spark so that the resulting heat tends to burn some of the hydrocarbons in the exhaust with the result of a lower total output.

The more recent automobiles, beginning with the year 1968, are equipped with control devices to reduce pollution from exhaust emissions. These have taken several forms. The older automobiles, however, are particularly subject to the problem pointed out above. Consequently, various expedients have been proposed for retarding the spark under idling conditions and unless and until the temperature of the engine rises excessively; when the latter occurs, the means for interrupting the normal spark advance is overridden so as to restore the normal advance until the engine temperature drops.

The prior arrangements, for the most part, required certain modifications of the engine. It is highly desirable, if any number of vehicles are to be modified, that the means for modification of the equipment be of such nature that it can be very quickly attached to the automotive vehicle with a minimum of tools and with no appreciable modification of the automotive engine.

SUMMARY OF THE INVENTION

The present invention is concerned with a very simple spark retarding device which can be connected to an engine and associated components of a typical motor vehicle with a minimum amount of effort. This is broadly accomplished by providing a device in which a control device is inserted in the connection between the intake manifold and the motor which advances the ignition distributor and controlling this control device by apparatus connected to the switching device normally associated with the brake control to indicate the actuation of the brakes and by a connection to the normal temperature sensing means for indicating when the temperature of the engine is excessively high. A reduction in the speed of the engine may also be effective to control this device and this is sensed by a speed responsive device which may take the form of an electronic tachometer, the input of which is connected across the points of the distributor. The output of this electronic tachometer may take the form of a voltage which can be applied to a voltage comparator. The output of the voltage comparator is fed through an amplifier to operate the control device which may take the place of an electric solenoid valve where the advancing means is a pneumatic motor.

The arrangement just discussed has the advantage that it can be very readily connected to an existing automotive vehicle. By using semiconductors in the electronic equipment, it is possible without any voltage changing devices, to employ the regular battery voltage. A connection to the battery and also across the points may be made by connecting the unit across the two primary terminals of the ignition coil. These terminals normally are such that an extra wire can be added without modification of the terminal. The connection to the brake actuator can be made by connection to the brake switch which again has a terminal permitting the ready insertion of an extra wire. Similarly, the normal temperature sensing switch used to control the light on the dash panel to indicate overheating of the car is provided with a terminal which permits the connection of an extra wire thereto. The equipment can readily be connected to any of various points to ground. As for the electrically operated valve inserted into the line between the vacuum manifold and the vacuum advance motor, the line leading to the vacuum advance motor is normally a hose which can readily be detached from the vacuum motor. This hose is then connected to the solenoid valve and a short piece of hose is then used to connect the fluid motor and the solenoid valve. The solenoid valve is sufficiently light that it can be supported by the hose without separate supporting means. The result is that the entire operation of installing the present equipment can be performed with a minimum of tools and can be done very quickly.

The signals from the brake switch and the temperature switch are applied to the circuit discussed above ahead of the amplifier and are designed to have fixed effects, each of which has a greater influence upon the input voltage of the amplifier than can be produced by the tachometer. Hence, if either the brake is operated or the temperature rises excessively, the valve or other control device in the line between the intake manifold and the ignition advancing motor is operated in the desired manner regardless of the speed of the engine.

Provision is made for attaching the device readily to automobiles either in which the brake switch is connected between the brake indicating light and ground or in which the brake indicating switch is connected between the ungrounded terminal of the battery and the indicating light.

Various other objects and features of the invention will be apparent from a consideration of the accompanying specification, claims and drawing, of which:

DESCRIPTION OF THE PREFERRED EMBODIMENT

Figures 1, 3:
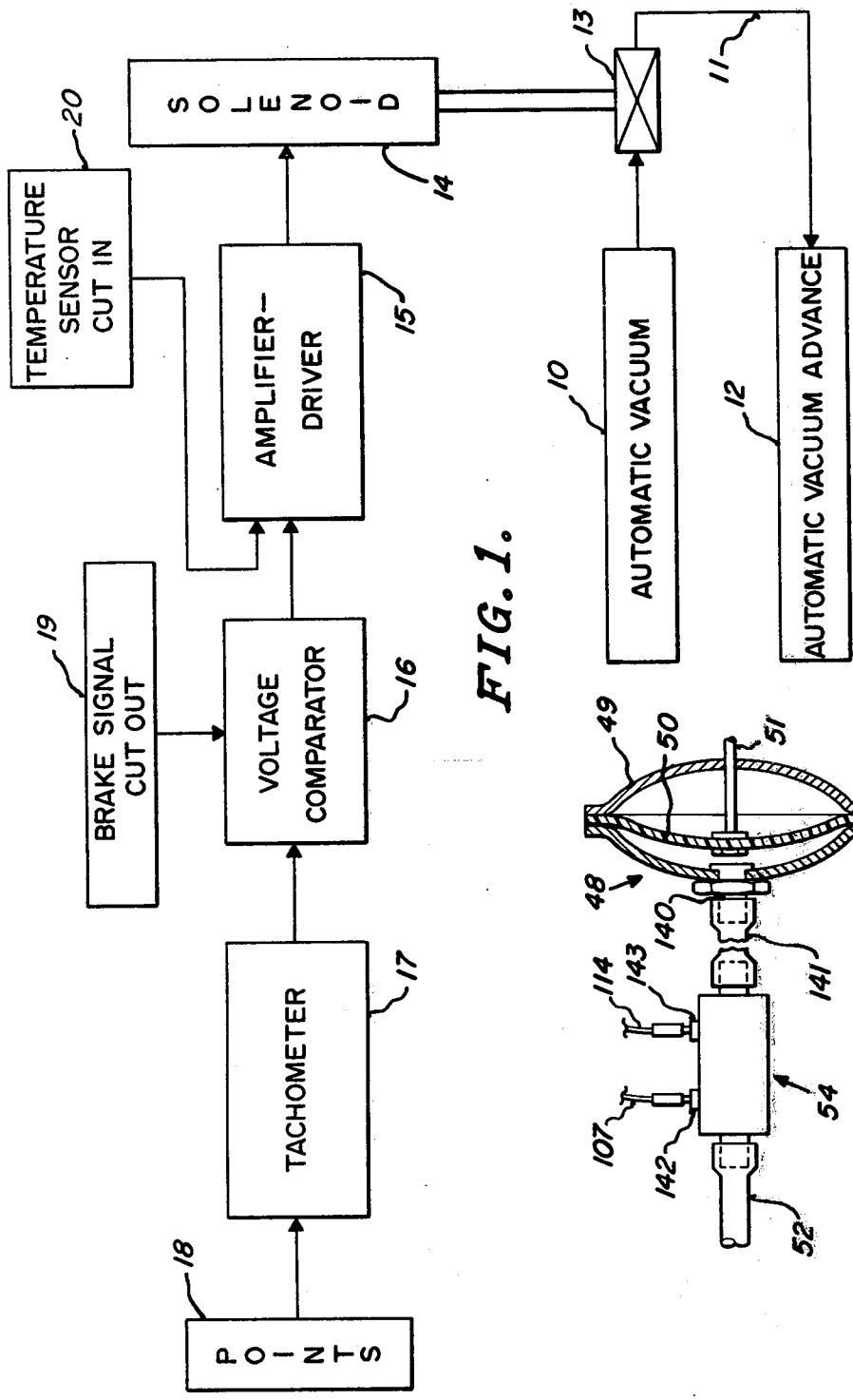
FIG. 1 is a schematic diagram showing in block form the various components of our invention.
FIG. 3 is a fragmentary view partly in section showing the manner in which the solenoid valve is attached to the vacuum advance motor.

Referring first to FIG. 1, the source of automatic vacuum is indicated by the reference numeral 10. This may be a connection to the intake manifold which specifically may take the form of a connection to the portion of the carburetor on the vacuum side of the throttle. The source of automatic vacuum is connected through a line 11 to the normal automatic vacuum advance 12 which usually takes the form of some motor connected to the advancing mechanism of the distributor. Usually, this motor is a vacuum motor and the line 11 is a fluid line. Interposed in the connection 11 is a control device 13 which, when the line 11 is a fluid line, may take the form of a valve. This valve is controlled by a solenoid 14, the energization of which is, in turn, controlled by an amplifier driver 15. The input voltage to the amplifier driver 15 is normally derived from the voltage comparator 16, one input to which is derived from a tachometer 17. The signal input to the tachometer is derived from a connection across the points 18 of the distributor. The numeral 19 is employed to designate the brake signal cutout which normally takes the form of a connection between the brake switch and the voltage comparator 16 to override the effect of the tachometer 17. The temperature sensor cut-in 20 normally takes the form of a connection between the usual temperature sensitive switch and an input to the amplifier driver. Again, the signal from the temperature sensitive switch is normally effective to override any signal derived from the tachometer 17.

Very briefly, the apparatus of FIG. 1 is effective when the speed as measured by tachometer 17 is below some value such as 1500 r.p.m. to result in the voltage comparator having an output signal such that when it is applied to the amplifier driver, the solenoid 14 is deenergized to close the valve between the source 10 of automatic vacuum and the automatic vacuum advance 12. Under these conditions, the automatic vacuum advance is rendered ineffective and the ignition is retarded. Similarly, if the brake is actuated, the signal from the brake signal cutout is effective to override the tachometer 17, even though this is indicating a speed above the predetermined value mentioned above, again to cause the solenoid 14 to be deenergized to close the valve 13 and interrupt the automatic vacuum afvance.

If the solenoid 14 is deenergized to interrupt the operation of the automatic vacuum advance, whether it be by reason of a low speed signal from the tachometer or a signal from the brake signal cutout 19, the temperature sensor cut-in 20 can be effective to energize the solenoid 14 to restore the automatic vacuum advance whenever the temperature sensed by the sensor 20 rises above a predetermined value such as to indicate that the engine is heating unduly.

Figures 2, 4:
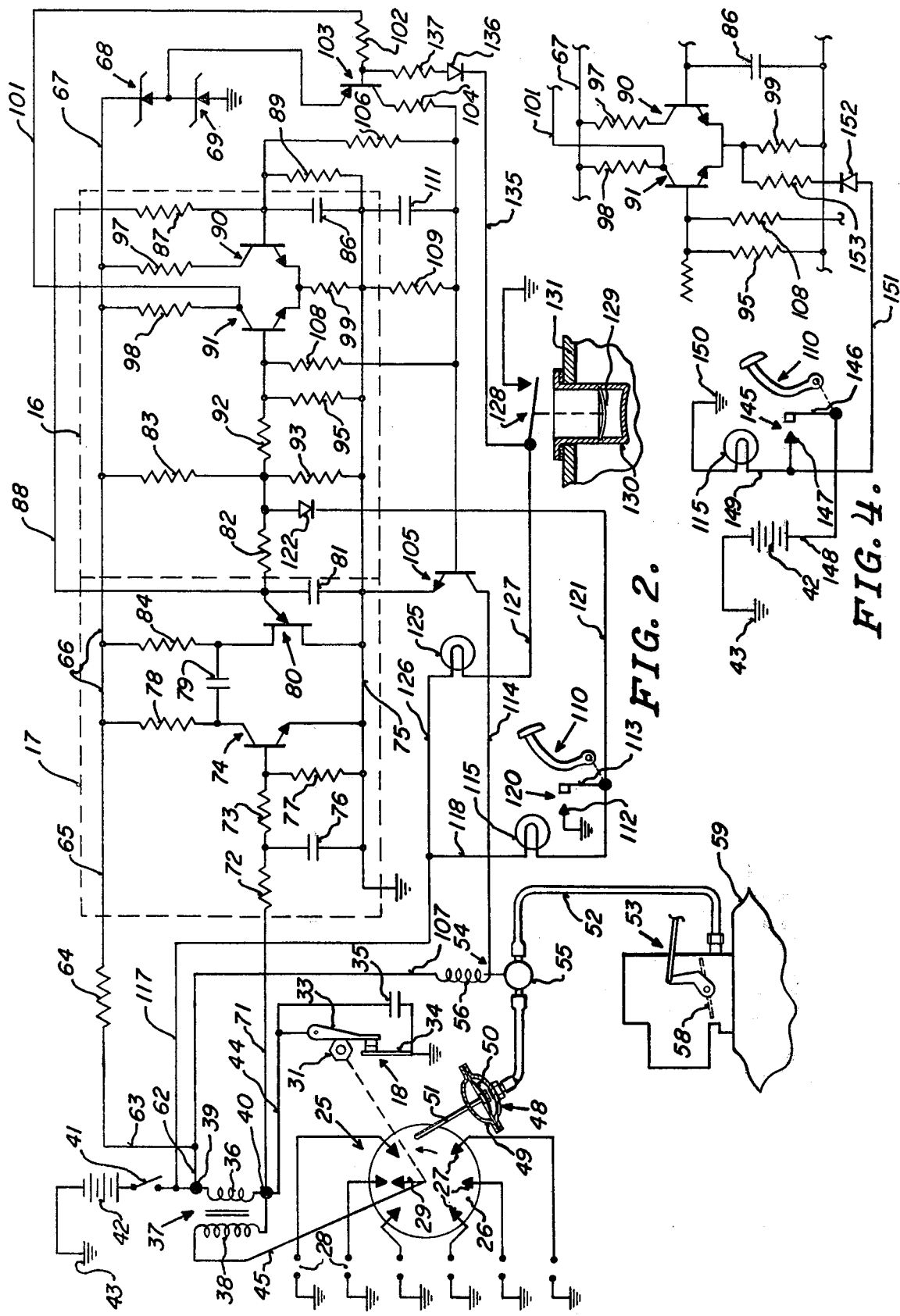
FIG. 2 is a schematic view showing in more detail the elements of FIG. 1.
FIG. 4 is a modification in which the brake indicator light switch is between the ungrounded terminal of the battery and the brake indicator light instead of between the brake indicator light and ground as in FIG. 2.

Turning now to FIG. 2, the apparatus of FIG. 1 is shown schematically in more detail. The numeral 25 is employed to designate the usual distributor having a rotatably adjustable plate 26 carrying a plurality of fixed contacts 27, each of which is connected to one of a series of spark plugs 28. Cooperating with the fixed contacts 27 is a rotating distributor arm 29 which is driven in a counterclockwise direction (as viewed in the drawing) to successively make electrical contact with the various fixed contacts 27 and successively connect the output of the distributor with the various plugs 28 in the desired sequence. Driven by the same shaft as the distributor rotor 29 is a cam 31 which cooperates with the "points" 18 formed by the two switch blades 33 and 34. Swtich blade 34 is grounded and stationary while switch blade 33 cooperates with the cam 31 and is effective to periodically move switch blade 33 away from switch blade 34 to "open" the points. The usual capacitor 35 is connected across the points.

The points 18, in the usual manner, control the flow of current through the primary winding 36 of an ignition transformer 37, having a relatively high voltage secondary 38. The primary winding 36 is provided with two electrical terminals 39 and 40. The terminal 39 is connected through the usual key operated ignition switch 41 to the ungrounded terminal of the usual automobile battery 42, the opposite terminal of which is connected to ground at 43. The lower terminal 40 of primary 36 is connected to the movable switch blade 33 of the points 18 through a conductor 44. The lower terminal of the high voltage secondary winding 38 is connected to terminal 40 and thus, when the points are closed, to ground. The opposite terminal is connected through a conductor 45 to the distributor arm 29. Thus, as the points 18 are opened and closed, the flow of current through the primary winding is interrupted to produce a high voltage in the secondary winding 38. The high voltage produced in secondary winding 38 is successively applied to the distributor points and hence to the respective spark plugs as the distributor arm 29 rotates.

The position of the fixed contacts 27 with respect to the distributor arm 29 can be adjusted by rotating the plate 26. This is normally done automatically by the vacuum advance motor designated in the drawing by the reference numeral 48 and constituting the automatic vacuum advance 12 of FIG. 1. The motor 48 has a vacuum chamber formed by a housing element 49 and a diaphragm 50 sealed in airtight relation with respect to each other. The diaphragm 50 has secured thereto a rod 51 which is operatively connected to a plate 26. A vacuum line 52 normally leads from this vacuum chamber of the vacuum motor 48 to the intake manifold side of the engine carburetor, a portion of which is shown schematically and designated by the reference numeral 53. In our apparatus, a solenoid valve 54 is interposed in the line 52, as will be described in more detail in connection with FIG. 3. This solenoid valve comprises a valve unit 55 and a solenoid actuator 56, corresponding to valve 13 and solenoid 14, respectively, of FIG. 1. In the specific form shown, the solenoid valve is closed when the solenoid winding 56 is deenergized and is opened upon energization of solenoid winding 56.

Referring to the carburetor 53, this is shown with the usual butterfly valve 58 and is connected to the intake manifold 59. Vacuum line 52 is connected to the carburetor 53 on the intake manifold side of the butterfly valve 50 and is thus effectively connected to the intake manifold.

The equipment which has been described so far, with the exception of the solenoid valve 54, is standard equipment commonly used on most automotive vehicles employing internal combustion engines. Normally, as the vacuum in the intake manifold increases, the vacuum results in a movement of diaphragm 50 downwardly to rotate the contact carrying plate 26 in a clockwise direction. The effect of this is to cause the distributor arm 29 to engage in any one particular distributor contact earlier in the engine cycle than would otherwise be the case. In other words, the "spark is advanced". As has been explained above, this type of operation works very well except at low speeds and when the engine is coasting to a stop. Under these conditions, the amount of unburned hydrocarbons emitted into the air becomes relatively high. Our apparatus provides, as explained above, for automatically interrupting this normal vacuum advance under conditions which would otherwise lead to the excessive discharge of unburned hydrocarbons into the air. This apparatus will now be described.

As was described in connection with FIG. 1, we employ a tachometer 17 and a voltage comparator 16. These, along with amplifier driver 15, are energized by a power source connected to the car battery 42. This connection is made to the upper terminal 39 of primary winding 36. Terminals 39 and 40 are normally of the type which permit the ready connection of an additional wire thereto so that the regular coil terminals can be used. Referring to the connection to the upper terminal, this terminal is connected through conductors 62 and 63, a resistor 64, conductor 65, a bus conductor 66 and conductor 67 to the upper terminal of a Zener diode 68. Connected to the lower terminal of Zener diode 68 is a further Zener diode 69 which, in turn, has its opposite terminal connected to ground. In a typical installation, the upper Zener diode may be designed to maintain a voltage across it of 2.5 volts while the lower one maintains a voltage across it of 6.8 volts. Thus, the total voltage of 9.3 volts is maintained across the two Zener diodes and hence between the positive bus conductor 66 and ground. The junction of the two Zener diodes is maintained at a potential of 6.8 volts above ground.

Turning to the tachometer 17, as previously explained, this derives a voltage signal from the periodic voltage across the points 18. The voltage across the points is derived by connection to the lower terminal of winding 66 and any suitable ground connection. It will be noted that the lower terminal of winding 66 is connected to the ungrounded terminal of the points 18 so that the voltage at this terminal with respect to ground is the voltage which exists across the points 18 at any given instant. As previously pointed out, terminal 40 is usually of a type which readily leads itself to the connection of an additional conductor thereto. The terminal 40 is connected through a conductor 71 and resistors 72 and 73 to the base of an N-P-N transistor 74, the emitter of which is connected to a ground conductor 75. A capacitor 76 is connected between the junctions of resistors 72 and 73 and the ground conductor 75 and serves to bypass high frequency components of the signal across the points 18. A resistor 77 is connected between the base and the emitter of transistor 74, the voltage across resistor 77 determining the voltage between the base and emitter and hence, the current flow from the base to the emitter. The collector of transistor 74 is connected through a resistor 78 to the positive bus conductor 66. The output of transistor 74 is applied through a capacitor 79 to one of the base electrodes of a unijunction transistor 80. The unijunction transistor 80 controls the charging and discharging of a capacitor 81 connected between the emitter and the other base electrode. The upper terminal of this capacitor 81 is connected through resistors 82 and 83 to the positive bus conductor 66. As long as the unijunction transistor 80 remains nonconductive, the capacitor 81 charges at a rate determined by resistors 82 and 83 and the capacitance of capacitor 81. The upper base terminal of unijunction transistor 80 is not only connected to the left-hand terminal of capacitor 79 but it is also connected through a resistor 84 to the positive bus conductor 66. Whenever the points 18 open, the voltage at terminal 40 and hence that applied through resistors 72 and 73 to the base 74 of the N-P-N transistor 74 rises abruptly causing the transistor 74 to be conductive. This results in the left-hand terminal of capacitor 79 assuming a value close to that of the ground conductor 75 and being charged by the current flow through resistor 84, capacitor 79 and transistor 74, the resistor 84 being relatively small in value compared with the resistor 78. This causes the right-hand terminal of capacitor 79, connected to the upper base member of unijunction transistor 80, to become positive, approaching the potential of the positive conductor 66. When this happens, the unijunction transistor 80 conducts, causing the emitter-base impedance to drop abruptly to discharge the capacitor 81 through the emitter and base of the transistor 80. Shortly thereafter, the points will reclose and the potential of the base of transistor 74 will be reduced sufficiently to render the transistor 74 nonconductive. When this happens, the potential across the capacitor 79 will reverse, the right-hand side connected to the upper base electrode of unijunction transistor 80 becoming negative with respect to the left-hand terminal. This will cause unijunction transistor 80 to cease conducting so that capacitor 81 can again start recharging. The length of time that capacitor 81 is allowed to charge and hence, the voltage it may be charged, is dependent upon the length of time that the contacts are closed. Thus, this depends upon the frequency at which the points are operated and hence, the speed of the engine.

The potential across capacitor 81 is impressed across a capacitor 86, the lower terminal of which is grounded and the upper terminal of which is connected through a resistor 87 and a conductor 88 to the upper terminal of capacitor 81. The capacitor 86 is bypassed by a relatively high resistor 89. The capacitor 86 thus assumes an average charge dependent upon the average voltage across capacitor 81 which, in turn, depends upon the frequency at which the points 18 are operated. The upper terminal of capacitor 86 is connected to the base electrode of an N-P-N transistor 90 which forms one of two transistors of the voltage comparator 16. The other transistor of the voltage comparator is also an N-P-N transistor and is indicated by the reference numeral 91. The base of transistor 91 has a voltage applied thereto which is dependent upon the potential across resistor 82, this base being connected through a resistor 92 to the right-hand terminal of resistor 82. Since resistor 82 is in series with capacitor 81, the right-hand terminal tends to become more positive as the average voltage across capacitor 81 decreases. This potential is applied to a resistor 93 connected between the right-hand terminal of resistor 82 and ground, and through resistor 92 across a relatively high resistor 95, connected between the base of transistor 91 and ground. The base voltage of transistor 91 thus varies in accordance with the voltage across resistor 82 and inversely to the voltage applied to the base of transistor 90. The collectors of transistors 90 and 91 are connected to the positive bus line 66 through resistors 97 and 98, respectively. The emitters of both transistors 90 and 91 are connected through a common emitter resistor 99 to the ground conductor 75.

When the average voltage across capacitor 81 is below a predetermined value, the voltage across capacitor 86 and hence, that applied to the base of transistor 90 will be below the voltage applied to the base of transistor 91, which will be higher due to the higher voltage drop across resistor 82. Under these conditions, the transistor 91 will be conductive, causing a voltage drop across resistor 99. Because of the relatively low voltage applied to the base of transistor 90, it will be nonconductive. The voltage drop across resistor 99 will raise the emitter voltage in a positive direction and will further insure the nonconduction of transistor 90. With transistor 91 conductive and transistor 90 nonconductive, the potential of the collector of transistor 91 will be substantially below the potential of the positive bus conductor 66, due to the voltage drop through resistor 98. If, on the other hand, the voltage across capacitor 81 is above a predetermined value, transistor 90 will be conductive and due to the lower voltage drop across resistor 92, the base of transistor 91 is less positive and transistor 91 will be nonconductive. This effect is further accentuated by a feedback connection to the base of transistor 91 which feedback connection will be described later. In any event, under these conditions, transistor 91 becomes nonconductive and the potential at the emitter approaches that of the positive bus conductor 66. Thus, either transistor 90 or transistor 91 will be conductive depending upon the average magnitude of the voltage across capacitor 81 and the putput as measured by the potential at the collector of transistor 91 will be of one magnitude or the other depending upon the average value of the voltage across capacitor 81 which, as previously explained, is dependent upon the speed of the engine.

The voltage at the emitter of transistor 91 which constitutes the output voltage of the voltage comparator 16 is applied through a conductor 101 and a resistor 102 to the base of a P-N-P transistor 103. Transistor 103 constitutes one of the two stages of the amplifier driver schematically designated as 15 in FIG. 1. The emitter of transistor 103 is connected to the junction of the two Zener diodes 68 and 69 and is thus maintained at a fixed potential which, with the values of the Zener diodes given above, is 6.8 volts. The collector of transistor 103 is connected through resistors 104 and 109 to ground conductor 75. The lower terminal of resistor 109 is connected to the base of an N-P-N transistor 105, the emitter of which is connected to the ground line 75 and the collector of which is connected to one terminal of the solenoid winding 56, the other terminal of which is connected through conductors 107 and 62 to the battery terminal 39. Thus, when transistor 105 is conductive due to the conductivity of transistor 103, a circuit is established from the positive battery terminal 39 through conductors 62 and 107, solenoid winding 56 and the collector-emitter circuit of transistor 105 to ground. Whenever the transistor 103 is conductive, a voltage drop is produced across resistor 109, this voltage drop being of such polarity that the lower terminal is positive. Since the lower terminal of resistor 109 is connected to the base of transistor 105, this results in the base of transistor 105 becoming more positive to cause current flow through the emitter-collector circuit of transistor 105 to establish the circuit through the solenoid winding 56 previously traced. As previously explained, when transistor 91 is conductive, the potential of the collector, which is connected by conductor 101 to the base of transistor 103, is lowered. This tends to make transistor 103 conductive to produce the voltage drop just described across resistor 109 and to cause the emitter-collector circuit of transistor 105 to be conductive. The lower terminal of resistor 109 is connected by resistor 108 to the base of transistor 91. Thus, as the voltage drop across resistor 109 increases due to the conductivity of transistor 103, the base of transistor 91 will become more positive to increase the conductivity of the transistor. The base of transistor 90 is also connected to the lower terminal of resistor 109 by a resistor 106. Resistor 106 is relatively high in magnitude as compared with resistor 108, however, so that the voltage drop across resistor 109 has a relatively small effect upon the potential of base 90. Looking at it another way, resistors 108 and 95 on the one hand and the resistors 106 and 89 on the other hand are connected in series with each other and across resistor 109. In each case, the base of the associated transistor is connected to the junction of the resistors. Resistors 108 and 95 are substantially equal in magnitude, while resistor 108 is very much greater than resistor 89. Hence, from a voltage divider standpoint, a relatively large portion of the positive voltage across resistor 109 tends to be applied to the base transistor 91 while a much smaller portion of this voltage tends to be applied to the base of resistor 90. The result is that transistor 91 becomes more conductive to further accentuate the relative conductivity of transistors 90 and 91. A capacitor 111 is connected in parallel with resistor 109 to filter the voltage across resistor 109 and bypass any transient voltages.

As has been pointed out above, it is desirable to interrupt the operation of the vacuum advance whenever the brakes are applied to decelerate the vehicle. This involves deenergizing the solenoid winding 56 to allow the solenoid winding 55 to close. We accomplish this in our apparatus with a very simple connection.

The numeral 110 designates the convention brake pedal of an ordinary vehicle. This brake pedal is connected through suitable means (not shown) to the brake actuating means which may be either in the form of direct mechanical connections to the brake shoe actuating cams or in the form of a power boost system. In any event, regardless of the system employed, it is conventional to have a switch which is either directly or indirectly operated as a result of manipulation of the brake pedal. This switch is employed to operate the brake light to warn drivers to the rear of the vehicle that the brakes are being operated and that the speed of the vehicle is being abruptly reduced. In the present case, the brake light indicating switch is designated by the reference numeral 120 and comprises a fixed grounded contact 112 and a movable contact 113. Whenever the brake pedal is depressed to cause actuation of the brakes, the switch blade 113 is engaged with contact 112 to cause the switch blade 113 to assume ground potential. The intended purpose of this in the normal automobile is, as indicated above, to energize the brake indicating light. In the present schematic showing this is indicated by the reference numeral 115. Upon depression of the brake pedal to close switch 120, a circuit is established from the positive terminal of the battery 42 through conductors 117 and 118, brake indicating light 115, conductor 119 and brake switch 120 to ground.

In our invention, a connection is made to the brake switch by connecting a wire to the brake switch terminal which normally has provision for the ready insertion of an additional conductor. This conductor is indicated by the reference numeral 121 and extends through a rectifier 122 to a point between resistors 82 and 92 in the connection extending to the base of transistor 91. Thus, when the brake switch is closed as a result of actuation of brake pedal 110, the base of transistor 91 is connected to ground through resistor 92 and rectifier 122 and brake switch 120. Thus, despite the voltage which tends to be applied from the right-hand end of resistor 92 to the base of transistor 91, the potential of the base is abruptly lowered under these conditions. This will insure that regardless of engine speed, the transistor 91 will be nonconductive. This will raise the potential of the emitter to cause transistor 103 and hence transistor 105 to become nonconductive, deenergize the solenoid winding 56 and cause closure of the solenoid valve 55.

It is also desirable that if the temperature of the engine rises excessively, the solenoid valve 54 be opened to permit a vacuum spark advance to avoid excessive heating of the engine. In order to simplify the installation of the present equipment, we utilize a very simple connection to the existing temperature switch commonly employed in many automobiles. In many automotive vehicles, it is customary to provide a light to indicate that the engine temperature is excessive. In order to operate this light, a temperature sensitive switch responding to the temperature of the engine is provided. Our invention utilizes this switch to provide the necessary signal for overriding the other controls to insure that the solenoid valve 56 is energized to open the same whenever the temperature rises excessively.

Referring to the specific structure, the temperature indicating light is indicated by the reference numeral 125. One terminal of this light is connected through conductors 126 and 117 to the positive terminal of the automobile battery 42. The other terminal of the light is connected through a conductor 127 to a switch 128 which, in turn, is actuated by a bimetallic element 129. The bimetallic element 129 is shown as a snap type which pops over center upon the temperature exceeding a critical value. The bimetallic element is preferably located within a well 130 firmly secured within an opening in the wall 131 of the water jacket of the engine. Suitable sealing means are, of course, provided to insure against leakage of the cooling fluid through the opening in which the well 130 is inserted. Switch 128 has a movable blade actuated by the bimetallic element 129 which cooperates with a fixed contact which is connected to ground. When the switch 128 is closed due to excessive temperature, it will be readily apparent that a circuit is closed from the battery through the temperature indicating light 125 and the switch 128 to ground. Our apparatus uses a connection to this switch including a conductor 135, a rectifier 136 and a resistor 137 to the base of the N-P-N transistor 103. It will be readily apparent that when the temperature is excessive and the switch 128 is closed, a connection will be established from the base of transistor 103 through resistor 137, rectifier 136, conductor 135 and switch 128 to ground. When the base of transistor 103 is thus connected to ground, the conductivity of transistor 103 and hence of transistor 105 is assured regardless of the effect introduced by the brake switch 120 or by the tachometer. As has been pointed out previously, the conductivity of transistor 105 causes energization of the solenoid winding 56 to open the valve 55 and restore the vacuum advance.

The apparatus described above can be applied with a minimum number of tools. As has been pointed out above, the connections to the power supply and to the points are made at terminals 39 and 40 which are readily accessible terminals on the ignition coil. The connection to the brake control and to the temperature control are made at the brake switch terminal and the temperature switch terminals. Again, these terminals are readily accessible. A ground connection to our equipment is also necessary. This can be made at any suitable point convenient for grounding. The only mechanical change necessary is the insertion of the solenoid valve 54. Due to the fact that vacuum line 52 is normally a rubber hose, the end of which is slipped over a nipple on the vacuum motor 48, this solenoid valve 54 can be readily inserted in position as shown in FIG. 3. In actual practice, the solenoid valve 54 is a relatively compact cylindrical unit which is supplied with two nipples, one on each end. In installing the same, the hose 52 is slipped off of the nipple 140 of the vacuum motor 48 and is slipped over the end of one of the nipples of the valve 54. A small piece of hose 141, which may be a piece cut off of the end of hose 52, is then slipped over the other nipple of the valve 54 and the nipple 140 of the vacuum motor 48. The solenoid valve is provided with two quickly detachable connectors 142 and 143, including plug members connected to wires 107 and 114 leading respectively to the battery and to the transistor 105. With this simple mechanical change and with the simple electrical connections described above, the equipment is completely installed ready to operate. This is very important inasmuch as the problem of modifying used automobiles to reduce the emission is one that requires very simple installation procedures which can be done with a minimum of expense and time.

OPERATION OF FIG. 1

As long as the engine speed is above the predetermined value to which the voltage comparator 16 is designed to respond and as long as the brake pedal 110 is not depressed, the winding 56 of solenoid valve 54 is energized to hold the valve 55 open and permit the vacuum from the intake manifold 59 to be applied to the diaphragm motor 48 to advance the ignition timing as the vacuum in the intake manifold increases. This is the normal operation of an internal combustion engine and at normal driving speeds and under normal driving conditions results in the optimum engine performance with a minimum of hydrocarbon emissions. The solenoid 56 is maintained energized under these conditions because the average value of the voltage applied across capacitor 81, as applied to the base of transistor 90 is less than the voltage applied to the base of transistor 91. It will be readily apparent that the faster the engine runs, the less time capacitor 81 has to charge before it is discharged by the unijunction transistor 80. Thus, with relatively high engine speeds, the voltage applied to the base of transistor 90 is less than that applied to the base of transistor 91. Under these conditions, transistor 91 will be conductive and the potential of its collector will be substantially less than that of the positive bus conductor 66 due to the voltage drop through resistor 98. This will lower the potential of the base of transistor 103 with respect to the emitter causing current flow between the emitter and collector of transistor 103 and through resistor 109. This, in turn, will cause current flow between the base and emitter of transistor 105 to, in turn, permit current flow between the collector and emitter of transistor 105. This will result in the completion of the circuit previously traced from the battery 42 through solenoid winding 56 and the collector-emitter circuit of transistor 105 to ground.

The condition which has just been described will continue to exist unless the brake is depressed or unless the engine speed drops below the critical value. This value normally is 1500 r.p.m. which represents a road speed of approximately 40 miles per hour. If the engine speed drops below a predetermined value, such as 1500 r.p.m., the average value of the voltage across capacitor 81 will rise sufficiently to cause the base of transistor 90 to be at a higher potential than the base of transistor 91. This will cause current flow through transistor 90. The resultant current flow through resistor 99 results in an increase in the potential of the emitter of transistor 91 to insure that this is turned off. This will result in the potential of the collector of transistor 91 rising to that of the positive bus 66 so that the potential of the base of transistor 103 is raised in a positive direction. This results in transistor 103 being "turned off" to, in turn, turn off transistor 105 to deenergize the solenoid winding 56.

If at any time the brake 110 is depressed, switch blade 113 is moved into engagement with grounded fixed contact 112. This, in turn, results in a connection being established from the right-hand side of resistor 82 to ground. This, in turn, results in the potential of the base of transistor 91 being lowered sufficiently that transistor 91 is turned off to raise the potential of the collector of transistor 91 and hence transistor 105. The effect of grounding the base of transistor 91 is so much greater than the effect of the voltage supplied to the base of transistor 90 from capacitor 81 that no matter how high the engine speed, if the brake pedal is depressed, the solenoid will automatically be deenergized to break the connection between the intake manifold 59 and the vacuum motor 48.

If while the spark ignition is being retarded as a result of the closure of valve 55, the engine should tend to overheat, the temperature responsive switch 128 is effective to override the tachometer 17 or the brake switch 120 and re-energize solenoid 56 to restore vacuum advance. This is true because the closure of temperature responsive switch 128 results in the base of transistor 103 being directly connected to ground through resistor 137. The effect of this is to make transistor 103 conductive regardless of the voltage existing at the collector of transistor 91. Thus, the conductivity of transistor 103 is assured, to insure the conductivity of transistor 105 and the energization of the solenoid winding 56.

MODIFICATION OF FIG. 4

In connection with FIG. 2, I have shown a brake switch which is connected between the brake warning light 115 and ground. In other words, the switching is done in the ground side of the circuit. This arrangement is commonly employed in automobiles. In some automobiles, however, the switching is done between the battery and the brake lamp 115. Where this is done, the connection from the brake switch to the apparatus for controlling the energization of the solenoid valve must be made at a somewhat different point than described above. Referring to FIG. 4, the brake pedal is again indicated by the reference numeral 110. In this case, the brake switch is indicated by the reference character 145. As was the case with the brake switch 120 of FIG. 2, the brake switch 145 has a movable switch blade 146 which moves into engagement with a fixed contact 147 upon depression of the brake pedal 110. In this figure, however, the brake switch 145 is connected between the battery 42 and the brake lamp 115 through conductors 148 and 149. The opposite terminal of lamp 115 is connected directly to ground at 150. The fixed contact 147 of the switch 145 is connected through a conductor 151, rectifier 152 and resistor 153 to the emitters of transistors 90 and 91. When brake switch 145 is closed, the positive terminal of the power supply 42 is thus connected to the emitter of transistor 91, raising its potential so high with respect to the base of the transistor that the transistor is rendered nonconductive. Under these conditions, the base of transistor 104 is raised in potential to "turn off" transistor 103 and hence transistor 105 to deenergize the solenoid winding 56.

CONCLUSION

It will be seen that we have provided an ignition retarding device which can be quickly installed in any conventional automobile and which is effective to interrupt the normal vacuum advance whenever conditions exist that tend to result in the emission of an excess of hydrocarbons. At the same time, care is taken to insure that the normal vacuum advance is restored at any time that the engine temperature rises excessively.

While we have shown certain specific embodiments of the invention for purposes of illustration, it is to be understood that the scope of our invention is limited solely by the scope of the appended claims.

We claim:

1. An ignition retarding device for an automotive vehicle having an internal combustion engine for propelling the vehicel and brakes for stopping the vehicle, in which the internal combustion engine has temperature sensing means controlled thereby for indicating when the temperature of the engine is excessively high, an ignition distributor adjustable to vary the ignition timing, means including a fluid motor for adjusting the ignition timing, and means including a connection between said fluid motor and the intake manifold of the engine for normally causing said motor to adjust the distributor to advance the timing as the vacuum in said intake manifold increases; and in which the brakes are controlled by a brake control having a switching device which is actuated to indicate the actuation of the brakes when the brake control is so operated; said ignition retarding device comprising:

a control device for insertion into the connection between the motor and the intake manifold of the engine to prevent advance of the timing from an increase in the vacuum in the intake manifold;

control means for said control device and designed for connection to the brake control switching device and effective when so connected and when said brake control is operated to actuate the brakes to cause said control device to prevent advance of the timing from the intake manifold vacuum;

and means connected to said control means and designed for connection to the temperature sensing means and effective when so connected and when the temperature of the engine is excessively high to prevent said control device from preventing advance of the timing from the intake manifold vacuum.

2. The retarding device of claim 1 in which the control device is a valve for use with an internal combustion engine wherein the spark advancing motor is a vacuum motor connected through a fluid line to the intake manifold and in which the valve is designed for insertion in such a fluid line.

3. The retarding device of claim 2 in which the valve is an electrically operated valve and in which said control means is an electrical control means controlling the energization of said valve.

4. The retarding device of claim 1 in which said control means includes a speed responsive means for connecting to an element driven by said engine for responding to the speed of the engine, said control means being effective whenever the speed sensed by said speed responsive means drops below a predetermined value to cause said control device to prevent advance of the timing from the intake manifold vacuum even though said brake control is not being operated to cause actuation of the brakes.

5. The retarding device of claim 4 for use with an engine in which the distributor has ignition points which are periodically opened and closed during each engine cycle and in which the speed responsive means is designed to be electrically connected across the points and is effective when so connected to produce an electrical effect dependent upon the frequency at which said points are activated.

6. The retarding device of claim 5 in which said speed responsive device is an electronic tachometer which produces a voltage output dependent upon the speed of the engine and which is connected through a voltage comparator circuit and an electronic amplifier to said control device to control the operation thereof in accordance with the voltage output of said tachometer.

7. The retarding device of claim 5 in which said speed device is an electronic tachometer which produces a voltage output dependent upon the speed of the engine and which is connected through a voltage comparator circuit and an electronic amplifier to said control device to control the operation thereof in accordance with the voltage output of said tachometer and in which the connections from the brake control switching device and from the temperature sensing means are connected to said control means ahead of said amplifier and are effective to change the input voltage to the amplifier by amounts greater than that resulting from changes in the voltage output of the tachometer.

8. The retarding device of claim 5 in which the electronic components of the electronic tachometer are semiconductors requiring the application thereto of voltages no greater than the voltage of a conventional automobile battery so that the automobile battery can be used as a source of power for the conrol means without the need for voltage increasing means.

9. The retarding device of claim 6 for use with an automotive vehicle in which the brake control switching device is connected between a brake signal light and ground and in which the connection from said control means to the switching device is effective when the switching device is closed in connection with actuation of the brakes to connect to ground a portion of the control means ahead of said amplifier such that the effect upon the input voltage to the amplifier is greater than that resulting from changes in the voltage output of the tachometer.

10. The retarding device of claim 6 for use with an automotive vehicle in which the brake control switching device is connected between the ungrounded terminal of the automobile battery and a brake signal light and in which the connection from said control means to the switching device is effective when the switching device is closed in connection with actuation of the brakes to connect to the ungrounded terminal of the battery a portion of the control means ahead of said amplifier such that the effect upon the input voltage to the amplifier is greater than that resulting from changes in the voltage output of the tachometer.

* * * * *